United States Patent
Ko

(10) Patent No.: US 7,447,132 B2
(45) Date of Patent: Nov. 4, 2008

(54) METHOD, MEDIUM, AND APPARATUS, FOR DETERMINING WHETHER A MEDIUM IS COPY PROTECTED

(75) Inventor: Seong-kyun Ko, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 627 days.

(21) Appl. No.: 11/006,611

(22) Filed: Dec. 8, 2004

(65) Prior Publication Data

US 2005/0128912 A1  Jun. 16, 2005

(30) Foreign Application Priority Data

Dec. 16, 2003 (KR) .................. 10-2003-0091897

(51) Int. Cl.
G11B 5/58 (2006.01)
G11B 7/00 (2006.01)

(52) U.S. Cl. ............... 369/53.21; 369/53.24; 369/53.31

(58) Field of Classification Search .................. None
See application file for complete search history.

(56) References Cited

U.S. PATENT DOCUMENTS 4,794,582 A * 12/1988 Furuyama ................ 369/53.24
4,979,210 A * 12/1990 Nagata et al. .............. 360/60
5,315,448 A * 5/1994 Ryan ........................ 360/60
5,513,260 A * 4/1996 Ryan ....................... 380/200
6,654,327 B2 * 11/2003 Kobayashi ............... 369/53.21

FOREIGN PATENT DOCUMENTS

| JP | 7-272282 | 10/1995 |
| JP | 8-102133 | 4/1996 |
| JP | 9-81938 | 3/1997 |
| JP | 11-66707 | 3/1999 |
| JP | 2002-358654 | 12/2002 |

* cited by examiner

*Primary Examiner*—Joseph Feild
*Assistant Examiner*—Peter Vincent Agustin
(74) *Attorney, Agent, or Firm*—Staas & Halsey LLP

(57) ABSTRACT

A method, medium, and apparatus for determining whether an optical disc is copy protected. The method includes measuring the level of radio frequency (RF) sum signals read from an optical disc, and establishing a gain of the RF sum signal; checking RF sum signals from an area of the optical disc in which no data is written; establishing a predetermined threshold level of the RF sum signals by using the RF sum signals read from a data recording area of the optical disc; comparing the level of the RF sum signals measured from the area in which no data is written with the sum of the level of the RF sum signals measured from the data recording area and the threshold level, and according to the comparison result, measuring the size of the area in which no data is written to determine whether the optical disc is a copy protected disc.

25 Claims, 6 Drawing Sheets

METHOD, MEDIUM, AND APPARATUS, FOR DETERMINING WHETHER A MEDIUM IS COPY PROTECTED

CROSS-REFERENCE TO RELATED APPLICATIONS

This application claims the priority benefit of Korean Patent Application No. 2003-91897, filed on Dec. 16, 2003, in the Korean Intellectual Property Office, the disclosure of which is incorporated herein in its entirety by reference.

BACKGROUND OF THE INVENTION

1. Field of the Invention

The present invention relates to optical discs, and more particularly, to a method, medium, and apparatus for determining whether an optical disc is copy protected by analyzing a predetermined disc area, e.g., an area without data and/or a string of pits.

2. Description of the Related Art

Generally, various discs, such as optical discs, are used to store information having various formats. Recently, due to the wide-spread availability and utility of recordable optical discs, such as CD-R, CD-RW, DVD-R, DVD-RW, and DVD-RAM, optical discs are commonly used as a private auxiliary memory device. Furthermore, due to the rapid development of optical disc-related technology, large-capacity digital versatile discs (DVDs) are also regularly used for similar purposes.

However, such wide-spread use of optical discs has led to a problem of the optical discs being used to implement illegal copying.

Since illegal copying, using optical discs, is performed digitally, a signal from a copied disc may not be significantly deteriorated, or altered, compared to a signal from the original disc. That is, a copied disc may have almost the same quality as the original disc, thereby ebbing sales of the original disc.

SUMMARY OF THE INVENTION

Embodiments of present invention provide a method, medium, and apparatus for determining whether an optical disc is copy protected by analyzing an area of the optical disc, e.g., an area without data and/or a string of pits.

Additional aspects and/or advantages of the invention will be set forth in part in the description which follows and, in part, will be obvious from the description, or may be learned by practice of the invention.

To achieve the above and/or other aspects and advantages, embodiments of the present invention set forth a method for determining whether a disc is a copy protected disc or a copied disc in a disc recording/reproducing system, the method including checking radio frequency (RF) sum signals from an area of an optical disc in which no data and/or string of pits is written, establishing a predetermined threshold level of the RF sum signals by using the RF sum signals read from a data recording area of the optical disc, and comparing a level of the RF sum signals measured from the area in which no data and/or pits is written with a sum of a level of the RF sum signals measured from the data recording area and the threshold level, and based on the comparison, measuring a size of the area in which no data and/or string of pits is written to determine whether the optical disc is a copy protected disc or whether the optical disc is a copied disc.

The method may determine whether the optical disc is a copy protected disc and whether the disc is a copied disc.

In addition, the method may further include measuring a level of the radio frequency (RF) sum signal read from the optical disc, and establishing a gain of the RF sum signal, include detecting a maximum level of the RF sum signals read from the optical disc, during a predetermined timer operating time, and adjusting the gain of the RF sum signals with respect to the maximum level of the RF sum signals.

Further, the area of the optical disc in which no data and/or pits is written can be within any program recording areas of the optical disc. Information about the area in which no data and/or pits is written may also be recorded in a lead-in area of the optical disc, as well as include location information.

The establishing of the predetermined threshold level of the RF sum signals may include determining a track jump direction and a number of tracks to be jumped, and performing track jumping in the data recording area by the number of tracks in the track jump direction, measuring a peak or bottom level of the RF sum signals read from a position resulting from the track jumping, and establishing the predetermined threshold level for checking the area in which no data is written, using the peak and bottom levels.

The comparing of the level of the RF sum signal and the measuring of the size of the area in which no data and/or pits is written may further include comparing the level of the RF sum signals measured from the area in which no data is written with a sum of a maximum level of the RF sum signal measured from the data recording area and the threshold level, measuring the size of the area where the level of the RF sum signal measured from the area in which no data is written exceeds the sum of the maximum level of the RF sum signal, and determining the optical disc to be a copy protected disc if the size of the area is greater than that of a predetermined reference area, or determining the optical disc to be a copied disc if the size of the area is not greater than the predetermined reference area.

The comparing of the level of the RF sum signal in the area in which no data is written with the sum of the level of the RF sum signal in the data recording area and the threshold level may include comparing the level of the RF sum signal in the area in which no data is written with the sum of the peak level or the bottom level of the RF sum signal in the data recording area and the threshold level.

In addition, the area where the level of the RF sum signal measured from the area in which no data is written exceeds the sum may be where the level of the RF sum signals is greater than the sum of the peak level of RF sum signals measured from the data recording area and the threshold level. Further, the area where the level of the RF sum signals measured from the area in which no data is written exceeds the sum may be where the level of the RF sum signals is lower than the sum of the bottom level of RF sum signals measured from the data recording area and the threshold level.

To achieve the above and or other aspects and advantages, embodiments of the present invention include a medium recording/reproducing method, including establishing a predetermined threshold level of signals read from a data recording area of a medium, comparing a level of signals measured from another area of the medium with a level of the signals read from the data recording area and the threshold level, measuring a size of the other area based on a result of the comparing, determining whether the medium is a copy protected medium or whether the medium is a copied medium based on the size of the other area, and recording/reproducing to/from the medium based on whether the medium is copy protected medium or whether the medium is a copied medium.

The medium may be an optical disc and the other area is an area in which no data and/or pits are written, wherein the other area may be a mirror region of the optical disc. The other area may be within the data recording area or another data recording area. Similarly, the data recording area and/or other data recording area may include a plurality of other areas. Further, a location of the other area may be recorded in an area of the medium other than the other area, the data recording area, or the other data recording area.

Further, the comparing of the level of signals measured from the other area of the medium with the level of the signals read from the data recording area and the threshold level further may further include determining whether the level of the signals measured from the other area exceeds a sum of a peak level of the signals measured from the data recording area and the threshold level. Likewise, the comparing of the level of signals measured from the other area of the medium with the level of the signals read from the data recording area and the threshold level may further include determining whether the level of the signals measured from the other area exceeds a sum of a bottom level of the signals measured from the data recording area and the threshold level.

To achieve the above and or other aspects and advantages, embodiments of the present invention include a copy protected/copied medium detection method, including establishing a predetermined threshold level of signals read from a data recording area of a medium, comparing a level of signals measured from another area of the medium with a level of the signals read from the data recording area and the threshold level, measuring a size of the other area based on a result of the comparing, and determining whether the medium is a copy protected medium or whether the medium is a copied medium based on the size of the other area.

To achieve the above and or other aspects and advantages, embodiments of the present invention include a medium including computer readable code controlling a computational device or devices to perform method embodiments of the present invention.

To achieve the above and or other aspects and advantages, embodiments of the present invention include a recording/reproducing apparatus, including a medium signal detector, and a controller controlling recording/reproducing to/from the medium based on method embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
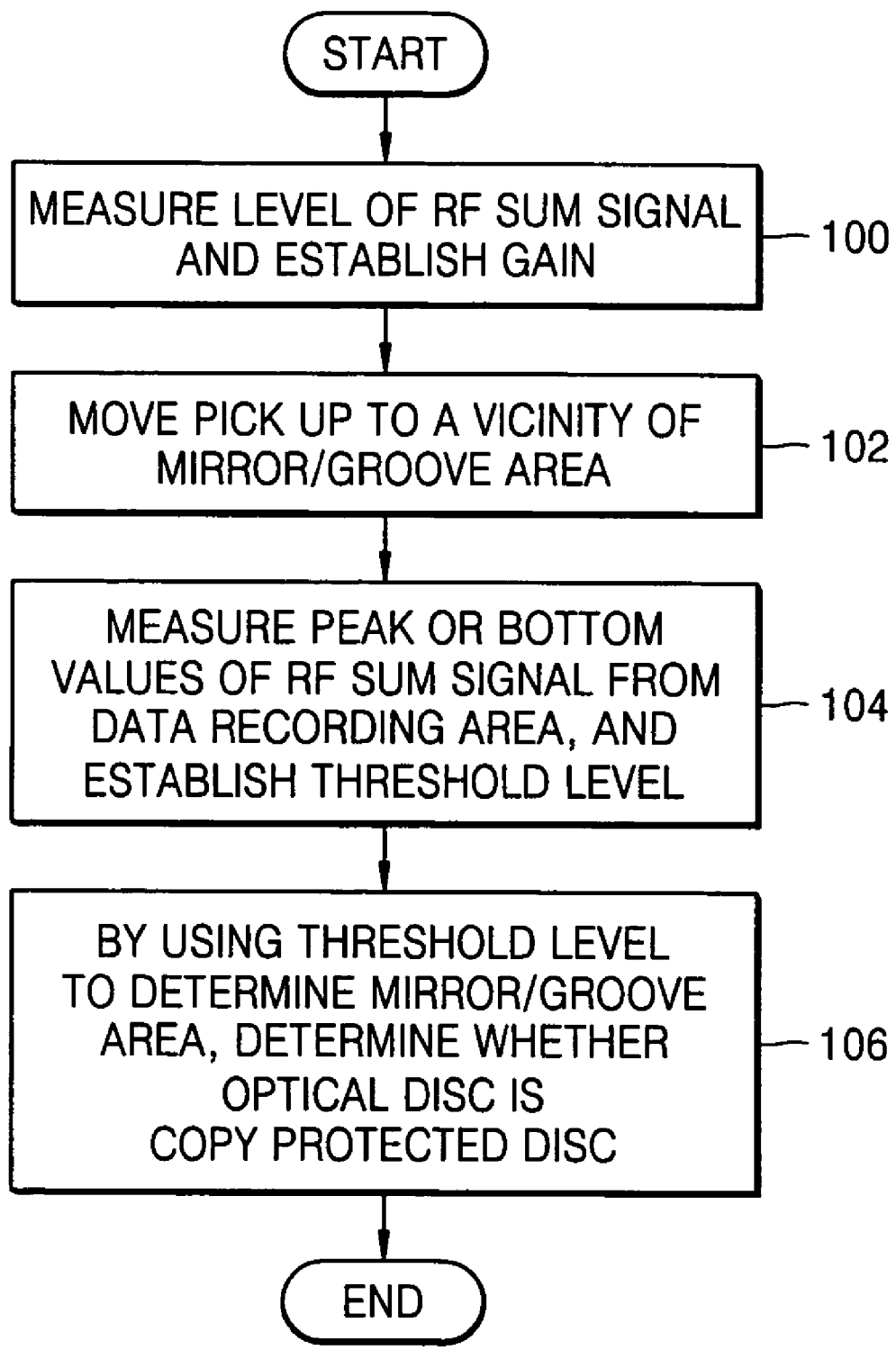
FIG. 1 is a flowchart illustrating a method for determining whether an optical disc is copy protected, according to an embodiment the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a flowchart illustrating a method for determining whether an optical disc is copy protected in a reproducing/recording system. The method includes at least measuring the level of a radio frequency (RF) sum signal read from an optical disc and establishing a predetermined gain, in operation 100, moving a pick-up to the vicinity of a mirror/groove area, in operation 102, measuring peak and bottom levels of an RF sum signal in a data recording area to determine a threshold level, in operation 104, and using the threshold level to study the mirror/groove area and determining whether the optical disc is a copy protected disc, in operation 106.

Figure 2:
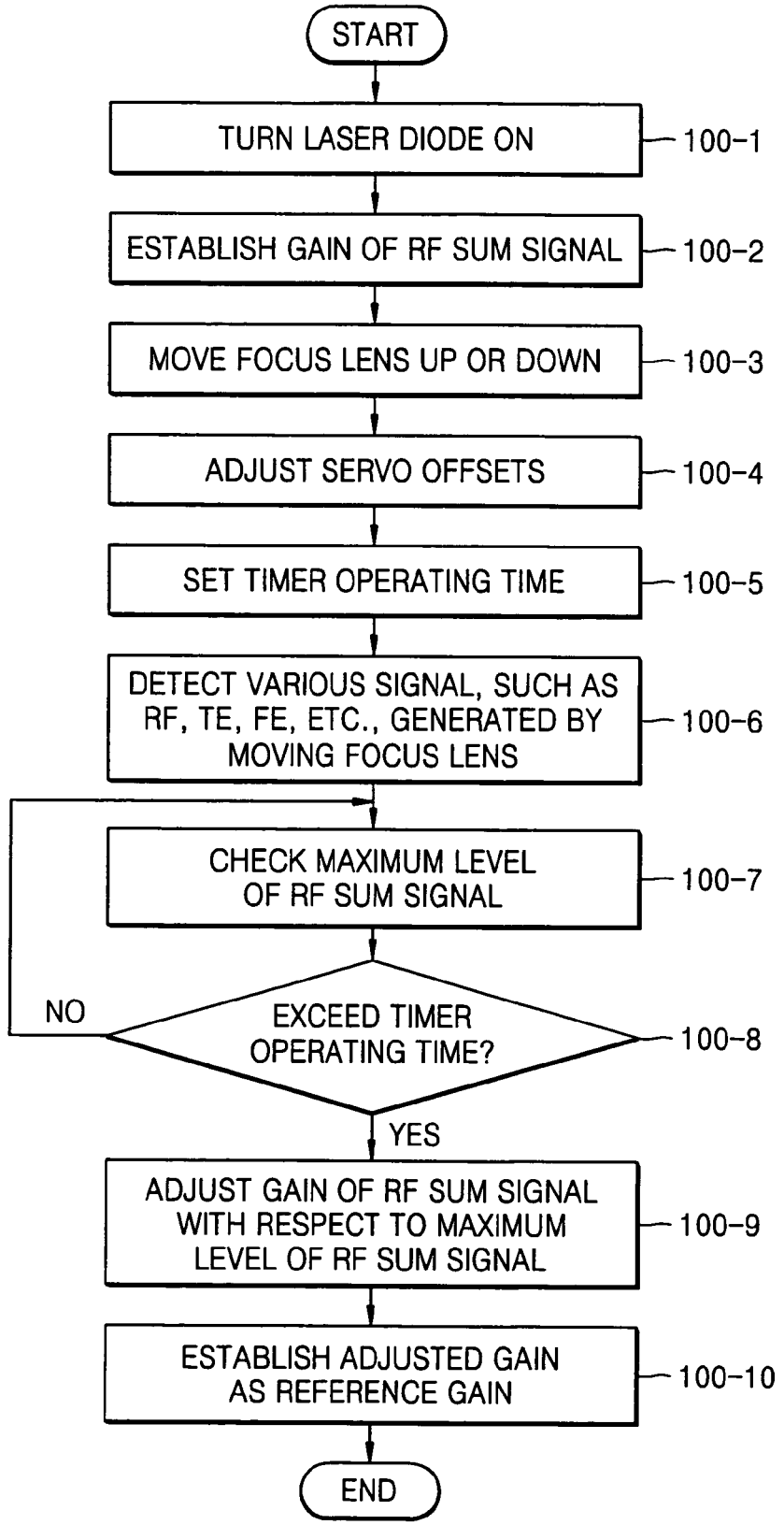
FIG. 2 is a flowchart illustrating a method for measuring the level of a radio frequency sum signal and setting a predetermined gain, for the method shown in FIG. 1, according to an embodiment of the present invention.

FIG. 2 is flowchart 1 illustrating a method for measuring the level of a radio frequency sum signal and setting a predetermined gain (operation 100 of FIG. 1). The method includes at least driving a laser diode, in operation 100-1, establishing a reference gain of the RF sum signal, in operation 100-2, moving a focusing lens up or down, in operation 100-3, adjusting offsets of a servo part, in operation 100-4, establishing operating time of a timer, in operation 100-5, measuring various signals like RF, tracking error (TE), and focus error (FE) signal generated by moving the focusing lens, in operation 100-6, checking a maximum level of the RF sum signal measured from the data recording area, in operation 100-7, determining whether the timer exceeds an operating time, in operation 100-8, and if the timer exceeds the operating time, adjusting the gain of the RF sum signal in terms of a maximum level of the RF sum signal, in operation 100-9, and setting the predetermined gain of the RF sum signal to be equal to the calculated gain, in operation 100-10.

Figure 3:
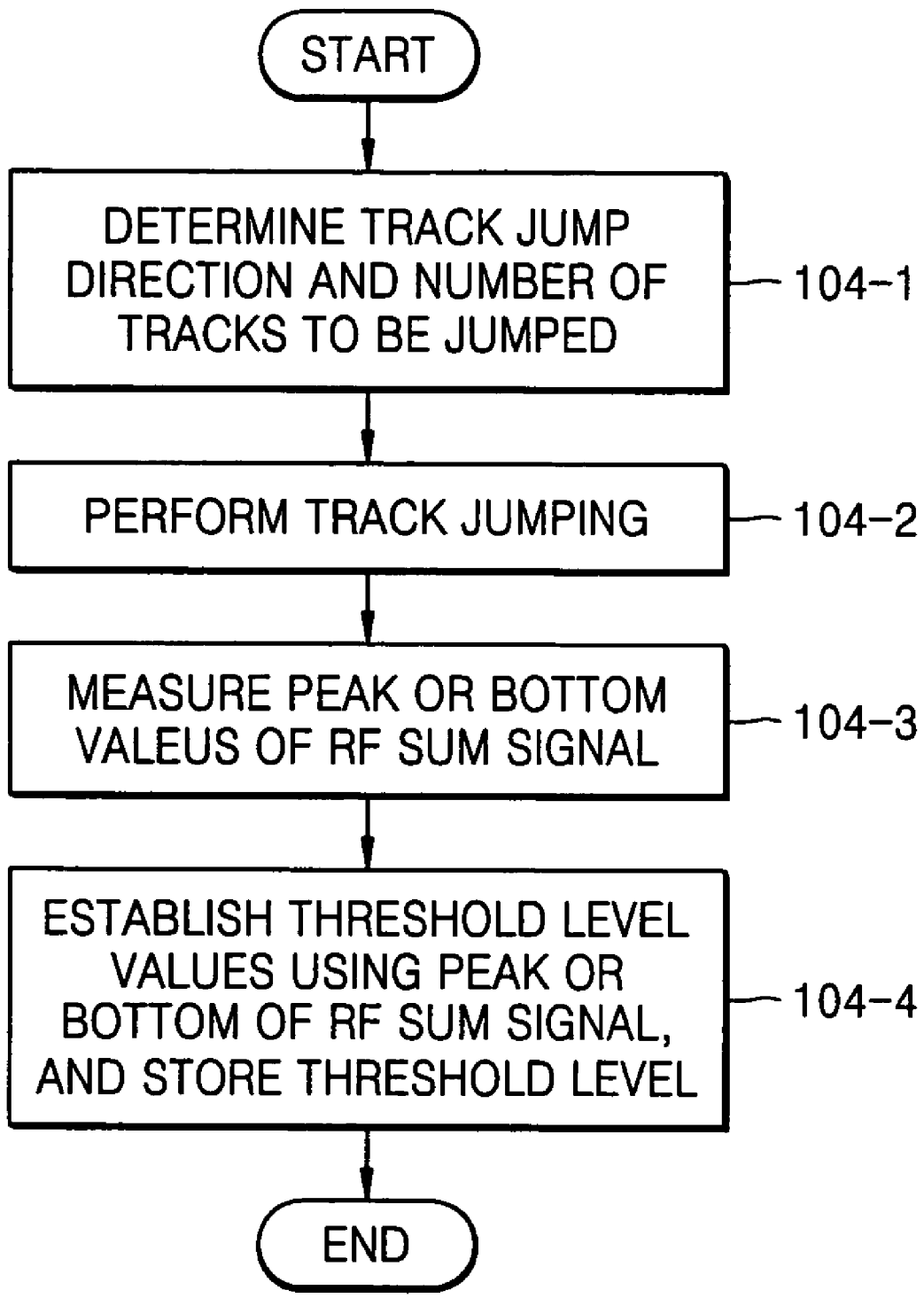
FIG. 3 is a flowchart illustrating a method for setting a threshold level by measuring peak and bottom values of a radio frequency sum signal, for the method shown in FIG. 1, according to an embodiment of the present invention.

FIG. 3 is a flowchart illustrating a method for setting a threshold level by measuring peak and bottom values of a radio frequency sum signal (operation 104 of FIG. 1). The method includes at least determining a track jump direction and a number of tracks to jump, in operation 104-1, performing track jumping, in operation 104-2, measuring peak and bottom values of an RF sum signal at a position resulting from the track jumping, in operation 104-3, and establishing the threshold level by using the peak and bottom levels and storing the threshold level, in operation 104-4.

Figure 4:
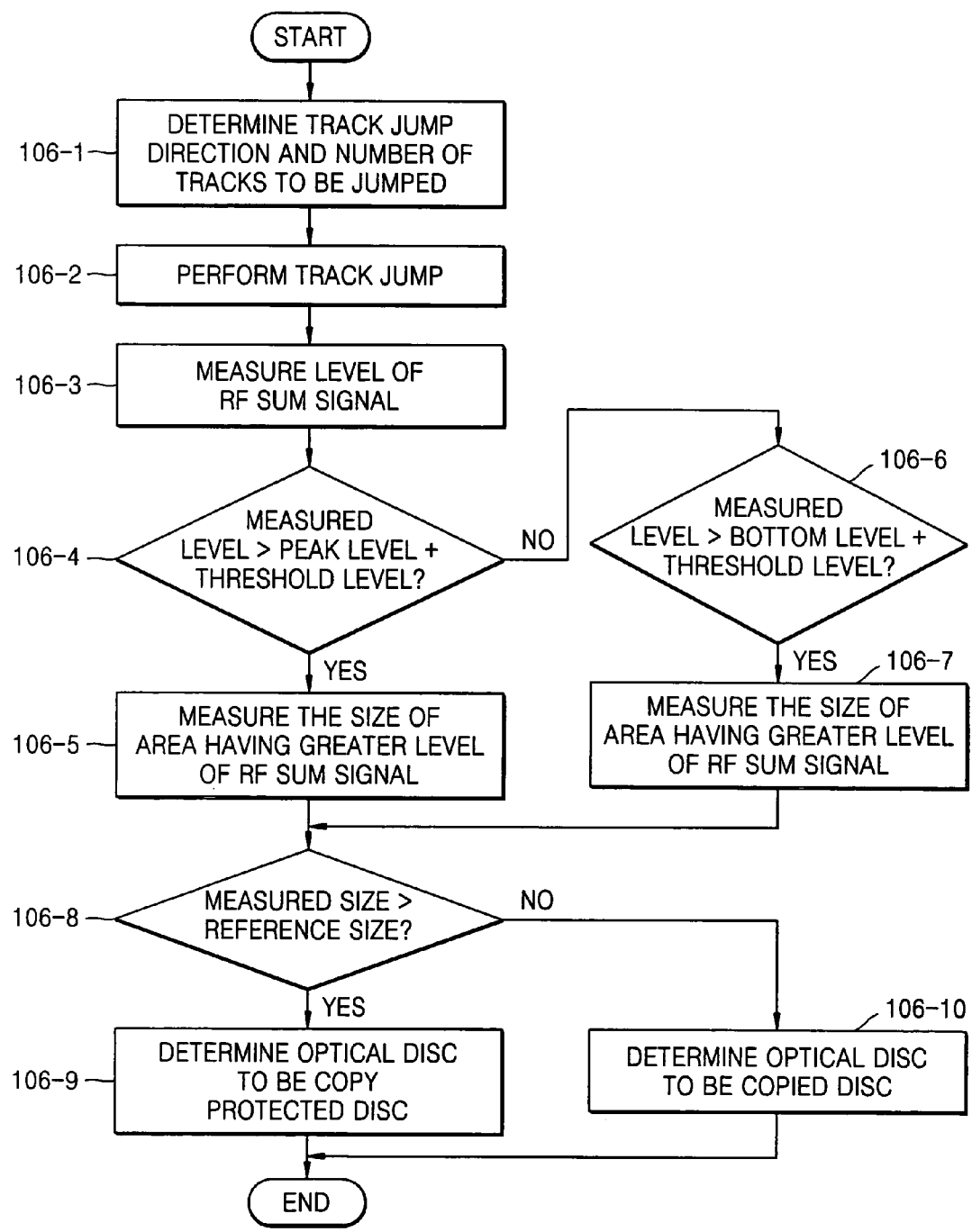
FIG. 4 is a flowchart illustrating a method for determining whether an optical disc is a copy protected disc by detecting a mirror/groove area, for the method shown in FIG. 1, according to an embodiment of the present invention.

FIG. 4 is a flowchart illustrating a method for determining whether an optical disc in question is a copy protected disc by detecting a mirror/groove area (operation 106 of FIG. 1). The method includes at least determining a track jump direction and a number of tracks to jump, in operation 106-1, performing track jumping, in operation 106-2, measuring the level of an RF sum signal at a position resulting from the track jumping, in operation 106-3, determining whether the measured level of the RF sum signal exceeds a sum of the peak level of the RF sum signal read from the data recording area and the threshold level, in operation 106-4, measuring the size of a corresponding area in which the measured level of RF sum signals exceeds the sum of the peak level of the RF sum signal read from the data recording area and the threshold level, in operation 106-5, determining whether the measured level of the RF sum signal at the position resulting from the track jumping exceeds a sum of the bottom level of the RF sum signal read from the data recording area and the threshold level, in operation 106-6, measuring the size of a corresponding area in which the measured level of RF sum signals exceeds the sum of the bottom level of the RF sum signal read from the data recording area and the threshold level, in operation 106-7, determining whether the size of the corresponding area in operation 106-5 or 106-7 exceeds a predefined reference area, in operation 106-8, if the corresponding area is larger than the predefined reference area, determining the optical disc to be a copy protected disc, in operation 106-9, and if the corresponding area is not wider than the predefined reference area, determining the optical disc to be a copied disc, in operation 106-10.

Figure 5A:
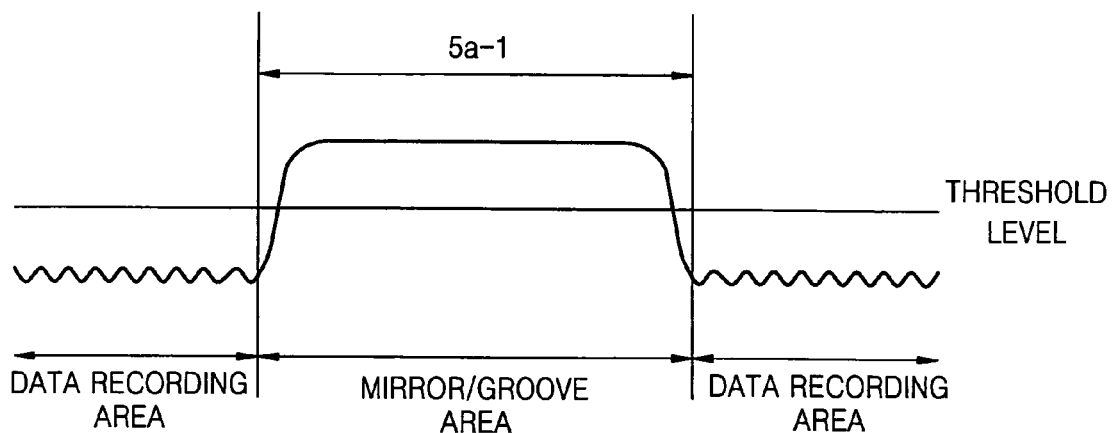
FIGS. 5A and 5B are waveforms of a radio frequency sum signal, showing the signal's peak level and bottom level, respectively.
Figure 5B:
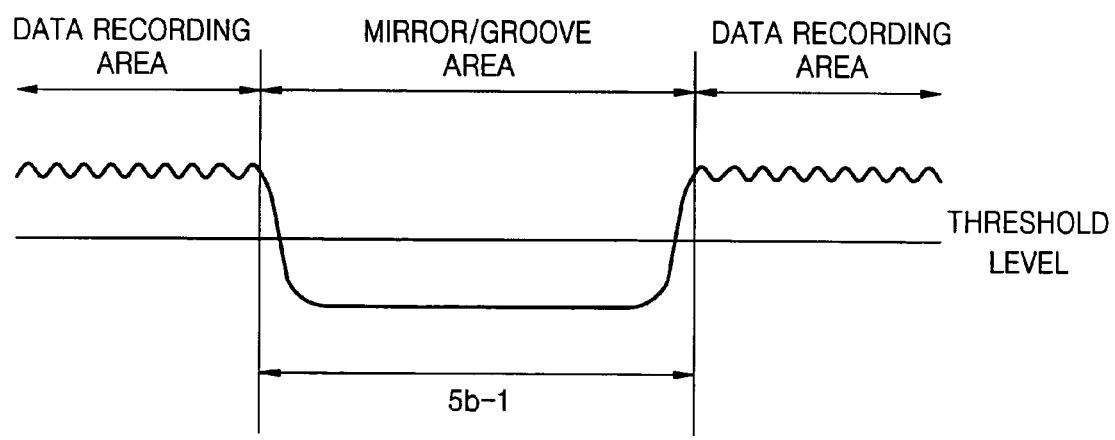

FIGS. 5A and 5B are waveforms of an RF sum signal read from an optical disc. That is, FIG. 5A shows a waveform of the RF sum signal in the vicinity of its peak, and FIG. 5B shows a waveform of the RF sum signal in the vicinity of its bottom, the RF sum signal being reproduced from an optical disc including a data area and a mirror/groove area.

Implementation of the method, medium, and apparatus according to an embodiment of present invention will now be further described, with reference to FIG. 1 through FIG. 5B.

An optical disc is a type of storage medium typically having spiral recording tracks on a transparent plastic surface, each track being separated from the next track by 0.7 to 1.6V, for example. A track may be made up of separate lands and grooves, or a continuous string of pits without lands and grooves, for example.

The area with a continuous string of pits can be formulated similar to a land, and an area therein may be referred to as a mirror area. In the mirror area, there is no distinction between the land and the pits. An area adjacent to the mirror area can be referred to as a groove area.

Accordingly, in the mirror/groove area, there may not be a string of pits, that is, there may not be data in the mirror/groove area. In this case, a tracking servo cannot operate over the mirror/groove area. The intensity of an RF sum signal in the mirror/groove area, where no data is written, is high, and the intensity of an RF sum signal in the data recording area is low.

In such an optical disc, according to an embodiment of the present invention, the mirror/groove area can be used as a copy protection process area, and is positioned in any program area of the optical disc. Information about the position of the mirror/groove area is written in a lead-in area of the optical disc.

When compared to the data recording area, the mirror/groove area has higher or lower level RF sum signal. The gain of the RF sum signal is also established in advance to prevent saturation in measuring the RF sum signal. And then, peak and bottom levels of the RF sum signal in the data recording area are measured and compared with the maximum or minimum level of a present RF sum signal in an area of the optical disc. According to the result of the comparison, it is possible to distinguish whether or not the optical disc is a copy protected disc.

Referring to FIG. 1, the level of the RF sum signal in a data recording area is measured and a gain of the RF sum signals is established. In an early stage, a peak or bottom level of the RF sum signal in the data recording area is measured by moving a focus lens up and down, and the gain of the RF sum signal is established such that the level of the RF sum signal is always within a predetermined range. A more detailed description of measuring the RF sum signal and establishing the gain will now be provided below, with reference to FIG. 2.

Referring to FIG. 2, a laser diode is turned on, in operation 100-1.

When the laser diode begins to operate, the gain of the RF sum signal is established, in operation 100-2.

Then, the focus lens is controlled to move up and down over the optical disc, in operation 100-3.

Servo offsets are adjusted, in operation 100-4. Conventionally, an optical disc reproducing/recording apparatus (not shown) includes an optical pick-up unit, a focus servo unit, and a tracking servo unit (altogether referred to as a servo part) for picking up information recorded on the optical disc. Adjustment of servo offsets is needed to reduce servo errors caused by physical deterioration of the servo part over time. Implementation of embodiments of the present invention can be performed by such an optical disc reproducing/recording unit modified to perform the same.

An operating time of a timer for checking the level of the RF sum signal is further established, in operation 100-5.

Various kinds of signals, such as RF, TE, and FE signals, generated by moving the focus lens are detected, in operation 100-6.

The maximum level of the RF sum signal in the data recording area is thus detected during the operating time of the timer, in operation 100-7. The maximum level of the RF sum signal can be the peak level as shown in FIG. 5A, or the bottom level as shown in FIG. 5B. It is then determined, in operation 100-8, whether the timer exceeds the operating time.

If the timer exceeds the operating time, the gain of the RF sum signal is calculated by considering the peak or bottom level of the RF sum signal, in operation 100-9. If the level of the RF sum signal in the data recording area exceeds a saturation level, that is, if the level of the RF sum signal in the data recording area is over the upper limit or under the lower limit, the level of the RF sum signal in the mirror/groove area also exceeds its upper or lower limit. Thus, the gain of the RF sum signal is adjusted with respect to the maximum level of the RF sum signal in such a way that the RF sum signal range is within the upper and lower limits.

The adjusted gain is then determined to be the reference gain of the RF sum signal, in operation 100-10.

Referring back to FIG. 1, the pick-up moves across the optical disc to the mirror/groove area, in operation 102. More than one mirror/groove area may exist in a part of the program area where specific data is written. Information about the position of the mirror/groove area is written in the lead-in area of the optical disc, and thus, the pick-up can move to the mirror/groove area by referring to the information in the lead-in area.

Then, in operation S104, peak and bottom levels of the RF sum signal in the data recording area are measured and a threshold level is established according to the measurement result. That is, peak and bottom levels of the RF sum signal in the data are measured to determine the threshold level used for detecting the mirror/groove area. Such operations of measuring the peak and bottom levels of the RF sum signal and establishing the threshold level will now be described in more detail below, with reference to FIG. 3.

Referring to FIG. 3, a track jump direction and the number of tracks to be jumped are set, in operation 104-1, and track jumping is performed accordingly, in operation 104-2.

A peak or bottom level of the RF sum signal at a position resulting from the track jumping is measured, in operation 104-3.

A threshold level is established by considering the peak or bottom level and the threshold level is then stored in a memory, in operation 104-4. An example of a threshold level established with respect to the peak level of the RF sum signal is shown in FIG. 5A, and a threshold level established with respect to the bottom level of the RF sum signal is shown in FIG. 5B.

Using the threshold level, the mirror/groove area is checked to determine whether the optical disc is a copy protected disc, in operation 106. In this operation, the level of the RF sum signal measured from the mirror/groove area is compared with the threshold level. There are 2 alternative comparison cases: the first case is to compare the threshold level with a peak level of the RF sum signal in the mirror/groove area, and the second case is to compare the threshold level with a bottom level of the RF sum signal in the mirror/groove area. Such an operation of determining whether the optical disc is a copy protected disc will now be described in more detail below, with reference to FIG. 4.

Referring to FIG. 4, the track jump direction and the number of tracks to be jumped to reach the vicinity of the mirror/groove area are determined, in operation 106-1, and the track jumping is then performed accordingly, in operation 106-2.

The level of the RF sum signal at a position resulting from the track jumping, possibly in the mirror/groove area, is measured, in operation 106-3. Examples of the results of measuring the level of the RF sum signal are again shown in FIGS. 5A and 5B.

In the first alternative, it is determined whether the level of an RF sum signal measured from a mirror/groove area exceeds a sum of the peak level of the RF sum signal measured from the data recording area and the threshold level, in operation 106-4. In this data recording area, the level of the RF sum signal is always less than this sum of the peak level of the RF sum signal and the threshold level, however in the mirror/groove area, the level of the RF sum signal is greater than this sum.

If the level of the RF sum signal is greater than this sum, the size of the corresponding area 5a-1 of FIG. 5A, which is this mirror/groove area, is then measured, in operation 106-5.

In the second alternative case, it is determined whether the level of an RF sum signal measured from a mirror/groove area exceeds a sum of the bottom level of the RF sum signal measured from the data recording area and the threshold level, in operation 106-6. In this data recording area, the level of the RF sum signal is always higher than this sum of the bottom level of the RF sum signal and the threshold, however in this mirror/groove area, the level of the RF sum signal is always lower than this sum.

If the level of the RF sum signal is lower than this sum, the size of the corresponding area 5b-1 of FIG. 5B, which is this mirror/groove area, is then measured, in operation 106-7.

It is determined, in operation 106-8, whether the corresponding area 5a-1 or 5b-1 is wider than a predetermined reference area.

If the corresponding areas 5a-1 or 5b-1 are wider than the predetermined reference area, the optical disc in question can be determined to be a copy protected disc, in operation 106-9.

If the corresponding areas are not wider than the predetermined reference area, the optical disc can be determined to be a copied disc, in operation 106-10.

As described above, according to the present invention, determining whether an optical disc is a copy protected disc or a copied disc can be efficiently performed by detecting an area in which no data and/or string of pits is written.

Figure 6:
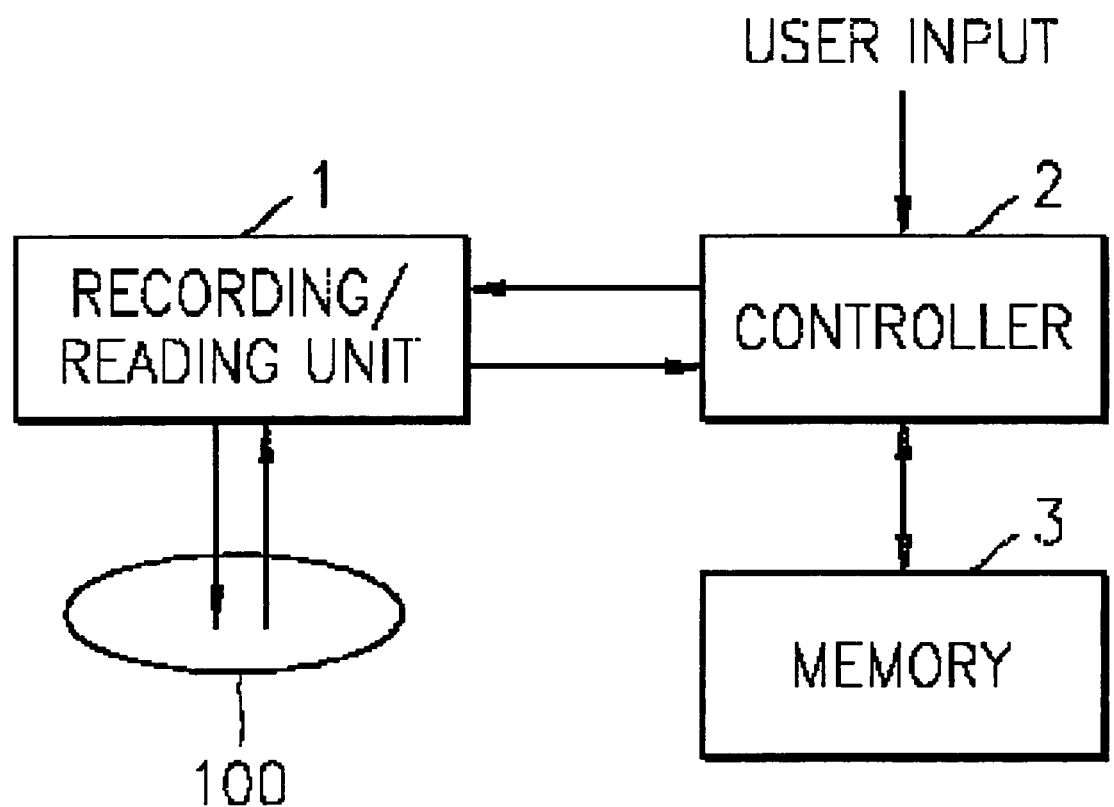
FIG. 6 is a block diagram of a recording and/or reproducing apparatus implementing embodiments of the present invention.

Accordingly, recording and/or reproduction to/from the optical disc can be based on such a copy protection/copied determination. FIG. 6 is a block diagram of a recording and/or reproducing apparatus. Referring to FIG. 6, the recording and/or reproducing apparatus may include a recording/reading unit 1, e.g., a pickup, a controller 2, and a memory 3. The recording/reading unit 1 records/reproduces data on an optical disc 10, according to embodiments of the present invention.

In addition to the above described embodiments, embodiments of the present invention can also be implemented through computer readable code and implemented in general-use digital computers through use of a computer readable medium including the computer readable code. The computer readable medium can correspond to any medium/media permitting the storing or transmission of the computer readable code.

The structure of data used in the embodiments of the present invention described above can be recorded on a computer readable recording medium in a variety of ways. Examples of the computer readable medium may include magnetic storage media (e.g., ROM, floppy disks, hard disks, etc.), optical recording media (e.g., CD-ROMs, or DVDs), and storage media such as carrier waves (e.g., transmission through the Internet).

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for determining whether a disc is a copy protected disc or a copied disc in a disc recording/reproducing system, the method comprising:

checking radio frequency (RF) sum signals from an area of an optical disc in which no data and/or string of pits is written;

establishing a predetermined threshold level of the RF sum signals by using the RF sum signals read from a data recording area of the optical disc; and comparing a level of the RF sum signals measured from the area in which no data and/or string of pits is written with a sum of a level of the RF sum signals measured from the data recording area and the threshold level, and based on the comparison, measuring a size of the area in which no data and/or string of pits is written to determine whether the optical disc is a copy protected disc or whether the optical disc is a copied disc.

2. The method of claim 1, wherein the method determines whether the optical disc is a copy protected disc and whether the disc is a copied disc.

3. The method of claim 1, further comprising measuring a level of the radio frequency (RF) sum signal read from the optical disc, and establishing a gain of the RF sum signal, comprising:

detecting a maximum level of the RF sum signals read from the optical disc, during a predetermined timer operating time; and adjusting the gain of the RF sum signals with respect to the maximum level of the RF sum signals.

4. The method of claim 1, wherein the area of the optical disc in which no data and/or pits is written can be within any program recording areas of the optical disc.

5. The method of claim 1, wherein information about the area in which no data and/or pits is written is recorded in a lead-in area of the optical disc.

6. The method of claim 5, wherein the information about the area includes location information.

7. The method of claim 1, wherein the establishing of the predetermined threshold level of the RF sum signals, comprises:

determining a track jump direction and a number of tracks to be jumped, and performing track jumping in the data recording area by the number of tracks in the track jump direction;

measuring a peak or bottom level of the RF sum signals read from a position resulting from the track jumping; and establishing the predetermined threshold level for checking the area in which no data is written, using the peak and bottom levels.

8. The method of claim 1, wherein the comparing of the level of the RF sum signal and the measuring of the size of the area in which no data and/or string of pits is written, further comprises:

comparing the level of the RF sum signals measured from the area in which no data is written with a sum of a maximum level of the RF sum signal measured from the data recording area and the threshold level;

measuring the size of the area where the level of the RF sum signal measured from the area in which no data is written exceeds the sum of the maximum level of the RF sum signal; and determining the optical disc to be a copy protected disc if the size of the area is greater than that of a predetermined reference area, or determining the optical disc to be a copied disc if the size of the area is not greater than the predetermined reference area.

9. The method of claim 8, wherein the comparing of the level of the RF sum signal in the area in which no data is written with the sum of the level of the RF sum signal in the data recording area and the threshold level includes comparing the level of the RF sum signal in the area in which no data is written with the sum of the peak level or the bottom level of the RF sum signal in the data recording area and the threshold level.

10. The method of claim 9, wherein the area where the level of the RF sum signal measured from the area in which no data is written exceeds the sum is where the level of the RF sum signals is greater than the sum of the peak level of RF sum signals measured from the data recording area and the threshold level.

11. The method of claim 9, wherein the area where the level of the RF sum signals measured from the area in which no data is written exceeds the sum is where the level of the RF sum signals is lower than the sum of the bottom level of RF sum signals measured from the data recording area and the threshold level.

12. A medium comprising computer readable code controlling a computational device or devices to perform the method of claim 1.

13. A recording and/or reproducing apparatus for recording and/or reproducing data to and/or from a medium, comprising:

a medium signal detector for detecting a signal from the medium; and a controller, based on the detected signal of the medium signal detector, controlling recording/reproducing data to and/or from the medium, and determining whether the medium is a copy protected disc or a copied disc according to the method of claim 1.

14. A medium recording/reproducing method, comprising:

establishing a predetermined threshold level of signals read from a data recording area of a medium;

comparing a level of signals measured from another area of the medium with a level of the signals read from the data recording area and the threshold level;

measuring a size of the other area based on a result of the comparing;

determining whether the medium is a copy protected medium or whether the medium is a copied medium based on the size of the other area; and recording/reproducing to/from the medium based on whether the medium is copy protected medium or whether the medium is a copied medium.

15. The method of claim 14, wherein the medium is an optical disc and the other area is an area in which no data and/or pits are written.

16. The method of claim 15, wherein the other area is a mirror region of the optical disc.

17. The method of claim 15, wherein the other area is within the data recording area or another data recording area.

18. The method of claim 17, wherein the data recording area and/or other data recording area comprise a plurality of other areas.

19. The method of claim 17, wherein a location of the other area is recorded in an area of the medium other than the other area, the data recording area, or the other data recording area.

20. The method of claim 14, wherein the comparing of the level of signals measured from the other area of the medium with the level of the signals read from the data recording area and the threshold level further comprises determining whether the level of the signals measured from the other area exceeds a sum of a peak level of the signals measured from the data recording area and the threshold level.

21. The method of claim 14, wherein the comparing of the level of signals measured from the other area of the medium with the level of the signals read from the data recording area and the threshold level further comprises determining whether the level of the signals measured from the other area exceeds a sum of a bottom level of the signals measured from the data recording area and the threshold level.

22. A medium comprising computer readable code controlling a computational device or devices to perform the method of claim 14.

23. A recording and/or reproducing apparatus for recording and/or reproducing data to and/or from a medium, comprising:

a medium signal detector for detecting a signal from the medium; and a controller, based on the detected signal of the medium signal detector, determining whether the medium is a copy protected disc or a copied disc and controlling recording/reproducing to and/or from the medium according to the method of claim 14.

24. A copy protected/copied medium detection method, comprising:

establishing a predetermined threshold level of signals read from a data recording area of a medium;

comparing a level of signals measured from another area of the medium with a level of the signals read from the data recording area and the threshold level;

measuring a size of the other area based on a result of the comparing; and determining whether the medium is a copy protected medium or whether the medium is a copied medium based on the size of the other area.

25. A medium comprising computer readable code controlling a computational device or devices to perform the method of claim 24.

* * * * *